United States Patent [19]

Lee et al.

[11] Patent Number: 5,664,123
[45] Date of Patent: Sep. 2, 1997

[54] DIGITAL COMMUNICATION I/O PORT

[75] Inventors: Young W. Lee, Orange; Sungwon Moh, Wilton; Arno Muller, Westport, all of Conn.

[73] Assignee: Pitney Bowes Inc., Stamford, Conn.

[21] Appl. No.: 301,086

[22] Filed: Sep. 6, 1994

[51] Int. Cl.⁶ .................................................. G06F 13/00
[52] U.S. Cl. .................. 395/309; 395/311; 395/858; 395/892
[58] Field of Search .................. 395/309, 311, 395/750, 831, 853, 858, 891, 892, 285, 286

[56] References Cited

U.S. PATENT DOCUMENTS

| | | | |
|---|---|---|---|
| 4,706,189 | 11/1987 | Brockman | 395/892 |
| 4,794,525 | 12/1988 | Pickert et al. | 395/750 |
| 5,214,785 | 5/1993 | Fairweather | 395/892 X |
| 5,239,627 | 8/1993 | Beck et al. | 395/892 |
| 5,418,911 | 5/1995 | Zilka et al. | 395/311 X |

FOREIGN PATENT DOCUMENTS

| | | | |
|---|---|---|---|
| 0 285 390 | 10/1988 | European Pat. Off. | G07B 17/02 |
| 3 118 652 | 5/1991 | Japan | G06F 13/38 |

*Primary Examiner*—Glenn A. Auve
*Attorney, Agent, or Firm*—Angelo N. Chaclas; Charles G. Parks, Jr.; Melvin J. Scolnick

[57] ABSTRACT

A micro control system includes a programmable microcontroller which is in bus communication with memory units and a operating power supply for providing operating power to said microcontroller. A communication module is part of the micro control system and is in communication with the data bus of the micro control system for receiving and transmitting data messages to an external device, and for encoding said transmitted data messages to conform to a serial communication protocol and decoding said received data messages. The microcontroller is programmed to generated a first control signal or a second control signal. An input-output interface is included as part of the micro control system and includes a number of switching units responsive to the first control signal of the microcontroller to place the respective switching units in a first mode of operation for providing communication between said communication module and a connector. The switching units also respond to said second control signal from the microcontroller to place said switching units in a second mode of operation for providing communication between said data bus of the micro control system and said connector to which connector the external device is attached.

2 Claims, 3 Drawing Sheets

5,664,123

DIGITAL COMMUNICATION I/O PORT

BACKGROUND OF THE INVENTION

This invention relates to digital communication ports.

It is known to provide a microprocessor system with the capability of communicating with external microprocessor systems utilizing one of the standard serial communication protocols, for example, a RS232 Communication Protocol. To facilitate this communication, it is known to provide a microprocessor system with a communication port. It is customary where the communication is expected to be carried out utilizing a standard communication protocol, for example, an RS232 Communication Protocol, to provide a 9-pin communication port which is specified under the RS232 protocol specification. It is also known to provide a microprocessor control system with a plurality of communication ports where it is desired to accommodate different communication protocols, for example, RS232, RS242, etc.

It is also known, that where different communication protocol specifications permit pin connector compatibility, the microcontroller can be programmed to be able to format digital messages in either protocol. System of the type here referred to, in this context, are characterized in that each unit has its own power supply and each unit is committed to serial communication via a dedicated serial communication port.

SUMMARY OF THE INVENTION

It is the objective of the present invention to disclose a microprocessor control system which allows, through a single communication interface, standard communication with external devices utilizing same communication protocols or alternatively to allow, through the standard communication I/O interface, direct access to the data bus of the microprocessor controller for parallel communication between the microprocessor controller and the external device.

It is further an objective of the present invention to present a microprocessor control system having a communication port which in a first mode of operation provides communication utilizing standard serial communication protocols, such as, RS232 or RS242, or under microprocessor control, alternatively, in a second mode allowing an external device to be directly communicated to the data bus of the micro control system in a parallel manner.

It is a still further objective of the present invention to present a microprocessor system which when operating in a second mode provides means to supply operating power to the external unit.

A micro control system such as that disclosed in U.S. patent application Ser. No. 08/163,629 is intended for use in controlling a electronic postage meter utilizing digital printing. As part of the control system, it has been determined desirous to provide a communication port in order to allow the microprocessor controller to communicate with the external environment utilizing any one of a number of standard communication protocol. However, it is also determined to be desirable to utilize the same I/O port to provide an external device direct access to a data bus for parallel communication with the microprocessor control system without providing an additional I/O port and interface. As a result, the microprocessor control system is comprised of a microcontroller in bus communication with a program memory, non-volatile memory and an application specific integrated circuit (ASIC). The ASIC includes a standard communication module and an address decoder. The address decoder provides control signals to the standard communication module for enabling the communication module. The output from the standard communication module (for example, RS232 communication module) is directed to an I/O interface whose output is directed to a 9-pin coupler.

Each of the outputs from the communication module are directed to the pin coupler through an I/O interface in response to an address decode signal. Alternatively, in response to a second address decode signal, selected pins of the pin coupler can be directly communicated to the internal bus of the ASIC while other ones of the pins are provided with operating voltages for the external device. During standard communication, utilizing conventional protocols, the I/O interface is responsive to control signals from the address decoder to switch enable normal protocol communication between the communication module and an external device connected to the communication pin. However, in a second mode, the interface switches in response to a control signal from the address decoder to effectively gate the respective I/O pin to a respective line of the data bus and power supply lines. In this manner, it is observed that a single port can be used for standard serial communication between the micro control system and an external micro control system or parallel communication between the micro control system and an external device. Additionally, the external device need not have an independent power supply.

DETAILED DESCRIPTION OF THE PREFERRED EMBODIMENT

Figure 1:
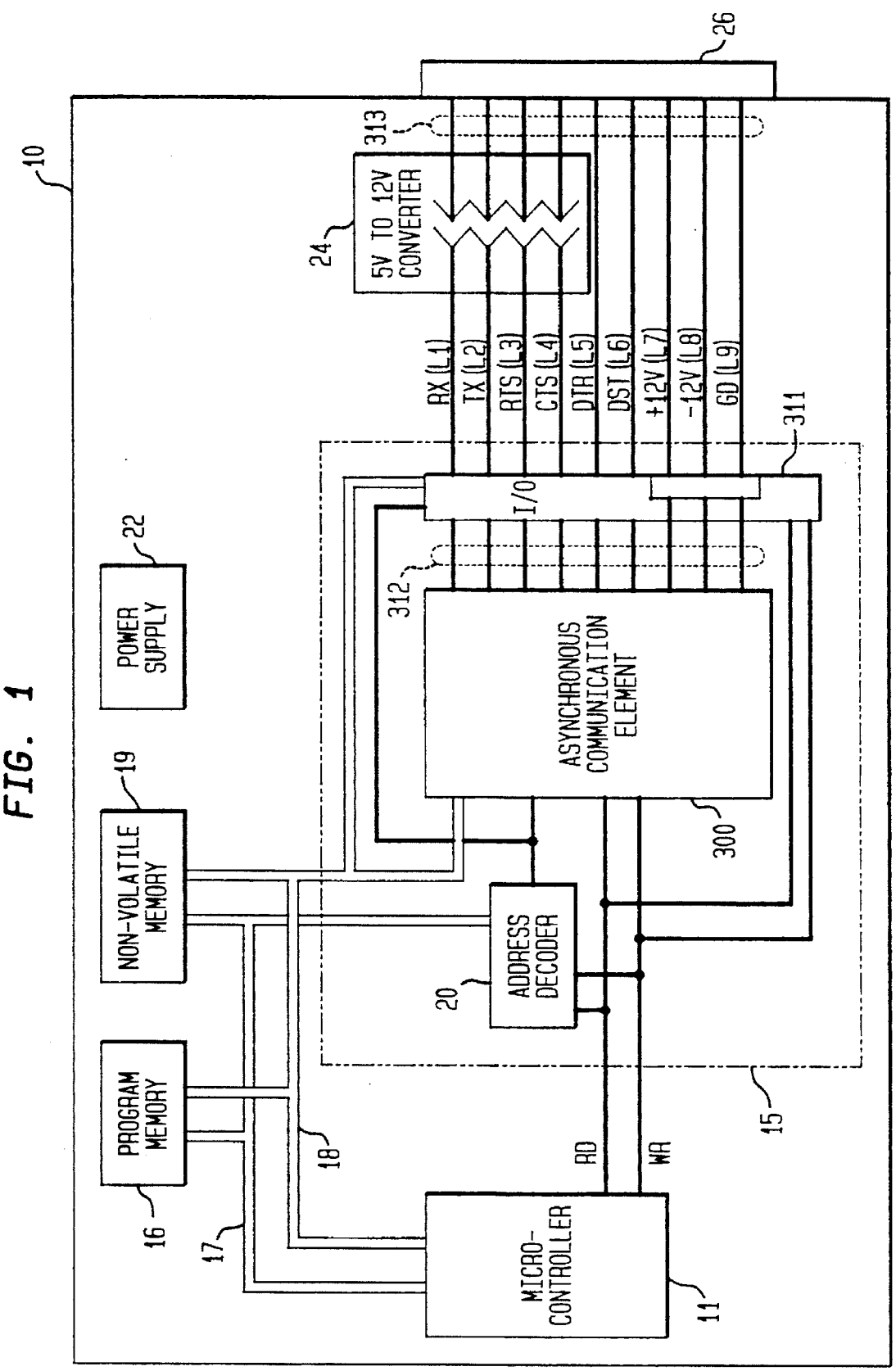
FIG. 1 is a schematic of a micro control system having a input/output interface in accordance with the present invention.

Referring to FIG. 1, a micro control system 10 is comprised of a microcontroller 11 and address bus 17 communication with a program memory 16 and non-volatile memory 19, and ASIC 15. The address bus 17 is also in communication with the address decoder 20 of the ASIC 15. The ASIC 15 includes a plurality of modules for performing different functions relative to the control system as is described in more detail in U.S. patent application Ser. No. 08/163,629, filed on Dec. 9, 1993, entitled CONTROL SYSTEM FOR AN ELECTRONIC POSTAGE METER HAVING A PROGRAMMABLE APPLICATION SPECIFIC INTEGRATED CIRCUIT, commonly assigned and herein incorporated by reference. One of the modules included in the ASIC 15 is a communication module 300. The communication module 300 is intended to be a standard communication module of any suitable design to accommodate one of any number of standard serial communication protocols. In a conventional manner, the communication module is enabled in response to control signals directed to it from the address decoder 20 in response to address data from the microcontroller 11. Generally, the communication module 300 receives data messages from the data bus and encodes the data to conform to a standard protocol and outputs the encoded data. Conversely, the communication module 300 decodes incoming data for access by the microcontroller 11.

The data bus 18 communicates with the communication module 300 in a standard or conventional manner, and also with an I/O interface 311 which is part of the ASIC 15. A communication bus 312 provides communication between the communication module 300 and the I/O interface 311. The output from the I/O interface is directed by I/O communication bus 313 to a connector coupler 26. In the preferred embodiment, a standard RS232 protocol is anticipated, the transmit, read and status control lines are intercepted by a conventional 5–12 volt converter 24 before directed to the coupler 26.

Figure 2:
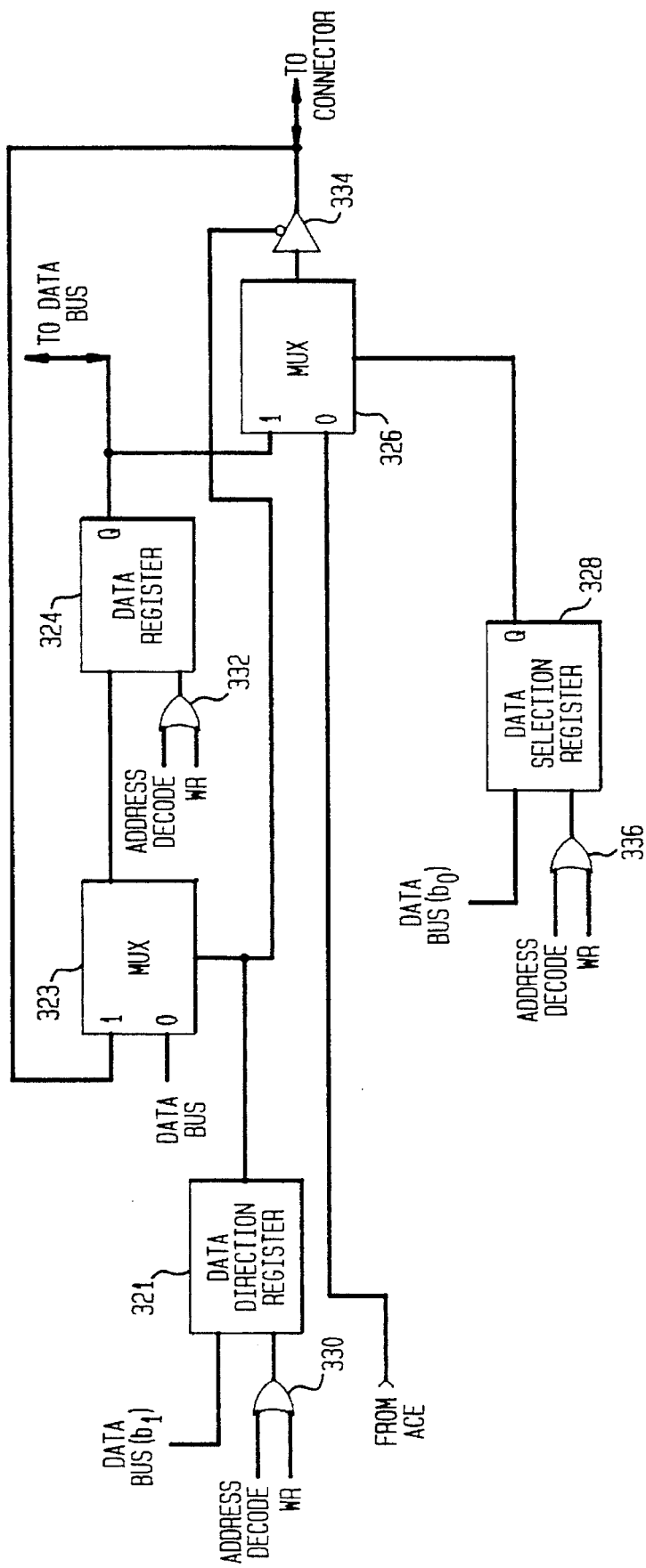
FIG. 2 is a schematic of the single channel of the multiple channeled I/O interface in accordance with the present invention.
Figure 3:
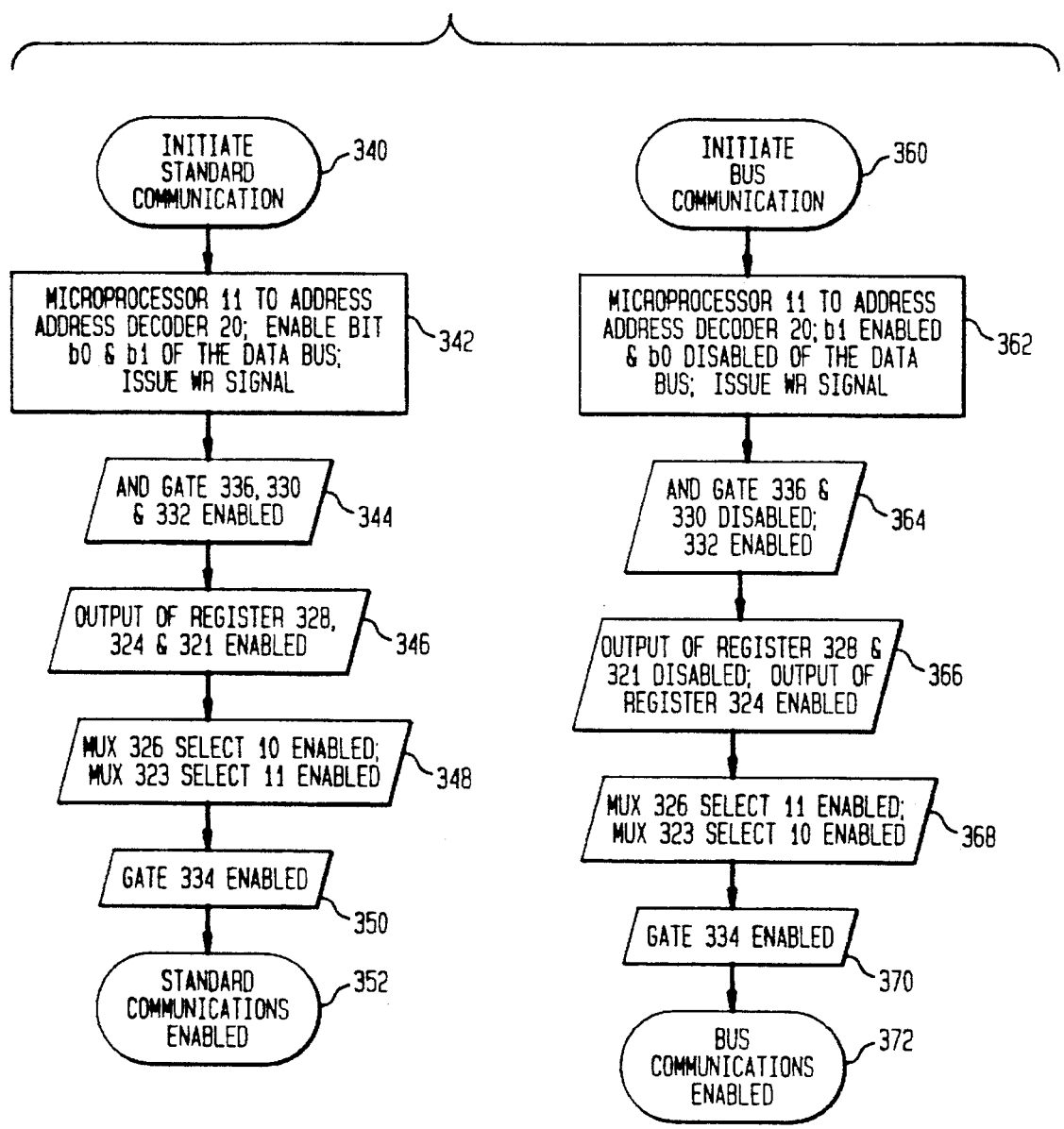
FIG. 3 is a process state diagram for standard communication and serial communication in accordance with the present invention.

Referring to FIGS. 2 and 3 in combination, the I/O interface has nine channels to accommodate the conventional RS232 communication protocols. Initiation of standard communication at logic block 340 is accomplished by the microprocessor 11 addressing the address decoder 20 and enabling bit 0 and bit 1 of the data bus while concurrently issuing a write signal at process block 342. The result of this action enables and gates 336, 330 and 332, as shown in process block 344. At process block 346, the output registers, 328, 324 and 321 are enabled. And also as shown in process block 348, the multiplex 326 is enabled to select input 0 and the multiplexer 323 is enabled to select input 1 as enabled. As shown at logic block 350, direction gate 334 is enable. Standard communication is therefore enabled at 352. It should be appreciated that the data bit b1 is responsive to the address issued by the microprocessor to enable or disable gate 334 to control communication direction through the I/O 311. It should further be appreciated that outgoing communication from the communication module 300 is directed through the multiplexer 326 to the connector 26 for each communication line of the communication bus 313. The incoming communication is directed through the multiplexer 323 and 324 to the data bus 18 to be received by the communication module in a conventional manner.

Bus communication which is initiated at process block 360 is commenced upon the microprocessor 11 addressing the address decoder 20 and enabling bit 1 and disabling bit 0 of the data bus and issuing a write signal at process block 360. This action indicated at state block 364 places the and gate 336 and 330 in a disable mode and enables and gate 332. As indicated at state block 366, the output register 328 and 321 is disabled and the output of the registers 324 is enabled. As indicated in state block 368, the multiplexer 326 has selection input 1 enabled and the multiplexer 323 has a selection input 10 enabled. Gate 334 is enabled for outgoing communication at state block 370. As a result, as indicated in state block 372, bus communication is now enabled.

Referring back to FIG. 1, it is observed that the conventional communication connector path for RS232 is a 9-pin connector, thereby, each one of the bus lines of bus 313 when connected to the ASIC as previously described with regard to FIG. 3, the bus lines L1–L9 serve as conventional communication connections as specified for the RS232 standard communication protocol. As contemplated in the preferred embodiment of the present invention where an external device is connected to the connector 26, all of the data lines are not necessary for communication, which in the preferred embodiment is a 6-bit parallel communication, thereby allowing the additional three lines to switched, not to the data bus, but a power supply module within the I/O port to provide a +12 volts, −12 volts in the ground. Therefore, it is appreciated that an external device may be attached to the connector 26 having power supplied by the main micro control system 10. This alleviates the need for independent power to the external supply module.

The afore description should not be taken as limited and is merely representative of the preferred embodiment of the invention. The full scope of the invention is set forth the appending claims.

What is claimed is:

1. An improved micro control system having a programmable microcontroller in bus communication with memory units, an operating power supply for providing operating power to said microcontroller, a communication module for receiving and transmitting data messages for conforming said data messages to a predetermined serial communication protocol and decoding said received data messages, wherein the improvement comprises:

a connector;

input-output means in communication with said communication module via a data bus for responding to selected control signals generated by said microcontroller and placing said input-output means in a first mode of operation to provide communication between said communication module and said connector and in a second mode to provide communication between said data bus and said connector;

said microcontroller being programmed to generate a first control signal or a second control signal, said input-output means being responsive to said first control signal to place said input-output means in said first mode of operation and said second control signal to place said input-output means in said second mode of operation;

said data bus having at least N data lines and;

said input-output means having M output data lines, where M-N is equal to or greater than 3;

wherein at least a first one of said output data lines is in communication with said operating power supply to provide a first operating electrical potential, at least a second one of said output data lines is in communication with said operating power supply to provide a second operating electrical potential different from said first operating electrical potential, and at least a third one of said output data lines in communication with said operating power supply to provide a neutral electrical potential.

2. An improved micro control system having a programmable microcontroller in bus communication with memory units, a data bus for providing bus communication, an operating power supply for providing operating power to said microcontroller, and a communication module in communication with said microcontroller through a data bus for receiving and transmitting data messages through a connector to an external device, and for encoding said transmitted data messages to conform to a serial communication protocol and decoding said received data messages, wherein the improvement comprises:

said microcontroller is programmed to generate a first control signal or a second control signal, an input-output interface having a plurality of switching means responsive to said first control signal of said microcontroller to place said switching means in a first mode of operation for providing communication between said communication module and said connector, and responsive to said second control signal of said microcontroller to place said switching means in a second mode of operation for providing communication between said data bus and said connector;

said data bus having N data lines;

said switching means having a plurality of M switches, N of said switches having respective first I/O pins in communication with respective ones of said data lines of said data bus, and wherein M-N of said first I/O pins are in communication with said power supply to receive: (i) a first electrical potential, (ii) a second electrical potential different from said first electrical potential, and (iii) a neutral electrical potential, where M-N is equal to or greater than 3, and M of said switches having respective second I/O pins which are in communication with said communication module, M of said switches having third respective I/O pins in communication with said connector, and;

wherein in said first mode each of said first I/O pins are in communication with said third I/O pins and in said second mode said second I/O pins are in communication with said third I/O pins.

* * * * *